United States Patent
Nimashakavi et al.

(10) Patent No.: US 8,787,386 B2
(45) Date of Patent: Jul. 22, 2014

(54) SYSTEMS AND METHODS FOR CREATING COMPOSED COMMUNICATION SERVICES

(75) Inventors: Kirankumar Nimashakavi, Fremont, CA (US); Ming Yin, Beijing (CN); Guang Yang, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 13/277,968

(22) Filed: Oct. 20, 2011

(65) Prior Publication Data

US 2013/0102337 A1 Apr. 25, 2013

(51) Int. Cl.
- H04L 12/28 (2006.01)
- H04L 12/54 (2013.01)
- H04L 12/24 (2006.01)
- H04L 12/56 (2006.01)
- H04W 4/02 (2009.01)
- H04W 4/12 (2009.01)
- H04W 28/24 (2009.01)

(52) U.S. Cl.
CPC ............ H04L 12/5695 (2013.01); *H04L 47/10* (2013.01); H04L 41/5003 (2013.01); *H04L 41/5022* (2013.01); *H04L 47/824* (2013.01); *H04L 12/2876* (2013.01); *H04L 41/5009* (2013.01); *H04L 41/5019* (2013.01); *H04L 47/29* (2013.01); *H04W 4/02* (2013.01); *H04W 4/12* (2013.01); *H04W 28/24* (2013.01)
USPC ...... 370/395.21; 370/229; 370/230; 370/232; 370/235; 370/236; 370/252; 370/395.2; 370/395.5; 370/395.52; 455/414.1; 455/450; 455/452.1; 709/203; 709/227; 709/228; 709/229; 709/230; 709/232; 709/233

(58) Field of Classification Search
CPC . H04L 12/5695; H04L 47/10; H04L 41/5003; H04L 41/5022; H04L 47/824; H04L 12/2876; H04L 41/5009; H04L 41/5019; H04L 47/29; H04W 4/02; H04W 4/12; H04W 28/24
USPC ........ 455/405–406, 414.1, 414.3, 450, 452.1; 370/229, 230, 232, 235, 236, 252; 370/395.2, 395.21, 395.5, 395.52; 709/203, 709/227, 228, 229, 230, 232, 233
See application file for complete search history.

(56) References Cited

U.S. PATENT DOCUMENTS

| | | | |
|---|---|---|---|
| 6,522,733 B1 * | 2/2003 | Cook | 379/112.06 |
| 7,933,814 B2 * | 4/2011 | Castellanos et al. | 705/28 |
| 8,213,433 B2 * | 7/2012 | Zhang | 370/395.21 |
| 2002/0147828 A1 * | 10/2002 | Chen et al. | 709/231 |
| 2007/0049245 A1 * | 3/2007 | Lipman | 455/406 |
| 2009/0186599 A1 * | 7/2009 | Cipoletti et al. | 455/406 |
| 2010/0146037 A1 * | 6/2010 | Little | 709/203 |
| 2010/0210265 A1 * | 8/2010 | Borzsei et al. | 455/435.2 |
| 2011/0086610 A1 * | 4/2011 | Baldwin et al. | 455/405 |
| 2011/0305147 A1 * | 12/2011 | Xu et al. | 370/252 |

* cited by examiner

*Primary Examiner* — Olumide T Ajibade Akonai
(74) *Attorney, Agent, or Firm* — Meyer IP Law Group (57) ABSTRACT

Systems and methods are described for creating composed communication services within a gateway to a telecom network. Composed communication services are virtual services which can be created by a network operator and which combine two or more actual communication services that perform functionality in the telecom network. For example, a composed messaging service can be created for a client, which combines methods from the MMS and SMS communication services. Subsequently, when the client invokes either SMS or MMS services in the gateway, those invocations will be counted against the composed service and the SLA and policy control will be applied against it accordingly.

19 Claims, 5 Drawing Sheets

SYSTEMS AND METHODS FOR CREATING COMPOSED COMMUNICATION SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to mobile communications and gateways for managing access to a wireless network and in particular to creating composed communication services for accessing telecom networks.

BACKGROUND

With the advent of mobile communications, more and more devices are becoming integrated with the world wide web. Everything from a simple cellular phone to more complex mobile devices such as laptops, electronic books, tablets, personal digital assistants (PDAs) and even automobiles are striving to maintain a constant connection to the internet. As a result of all this interconnectivity, websites and other online application providers have been showing an ever increasing interest in providing services to these mobile clients.

For mobile network operators (MNOs) that own the network and access to the mobile subscriber, onboarding all of these third party service providers and applications has not proved to be easy. A multitude of issues and problems may arise when managing large numbers of applications attempting to access the telecom network. One such issue involves applying policies and service level agreements to the communications flowing to and from the network.

In many cases, providing centralized management and control over all these communications can be a quite complex and tedious task for a network operator, especially when it involves large numbers of applications. What is needed is an improved way to create and manage the various services that can be accessed in the telecom network.

BRIEF SUMMARY OF THE INVENTION

Systems and methods are described for creating composed communication services within a gateway to a telecom network. Composed communication services are virtual services which can be created by a network operator and which combine two or more actual communication services that perform functionality in the telecom network. For example, a composed messaging service can be created for a client, which combines methods from the MMS and SMS communication services. Subsequently, when the client invokes either SMS or MMS services in the gateway, those invocations will be counted against the composed service and the SLA and policy control will be applied against it accordingly.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with various embodiments of the invention, a policy enforcement gateway is described which enables the creation of composed communication services. The gateway is positioned to control and manage access to a telecommunications network (mobile cellular phone network). The gateway includes a plurality of communication services for accessing functionality in the telecom network, including but not limited to send short messaging service (SMS) message, send multimedia messaging service (MMS) message, find terminal location, and the like. In accordance with an embodiment, these communication services comprise Java classes and methods in the gateway, which are used by clients to invoke the appropriate functionality in the telecom network. Composed communication services are virtual services which can be created by a network operator and which combine two or more actual communication services that perform functionality in the telecom network. For example, a composed messaging service can be created for a client, which combines MMS and SMS communication services. Subsequently, when the client invokes either SMS or MMS services in the gateway, those invocations will be counted against the composed service and the SLA and policy control will be applied against it accordingly.

In accordance with an embodiment, a composed service is a service implemented through the composition of two or more gateway communication services (e.g. SMS+Terminal Location+ . . . ). Once the composed service is created, all requests invoking the communication services are considered as the requests of the composed service. A service level agreement (SLA) can be created specifically for the composed service. Such composed service SLA can be defined on either application group scope or service provider group scope. It includes all service types of selected communication service and request rate/quota restriction information. In accordance with an embodiment, all communication services in the composed service share the same budget restriction in its SLA. Any request of the composed service will trigger increase of the budget. If a request exceeds the restriction, all subsequent requests of the composed service will be denied.

The gateway can apply functionality to allow throttling on the composed service level. A telecom operator can define a group of communication services. All communication services in the composed service can be made available and registered in the gateway. A communication service can be shared with multiple composed services. Stated differently, a single communication service can be included in multiple composed services. In accordance with an embodiment, by default, all methods of selected communication service belong to its composed service, however a composed service can also be defined at method level granularity. This means that detailed methods used in the composed service can be specified by the operator.

An XSD schema of SLA can be allow an operator define composed service in the SLA. The enforcement of the SLA is done in an AND manner with the legacy rate/quota checking.

Figure 1:
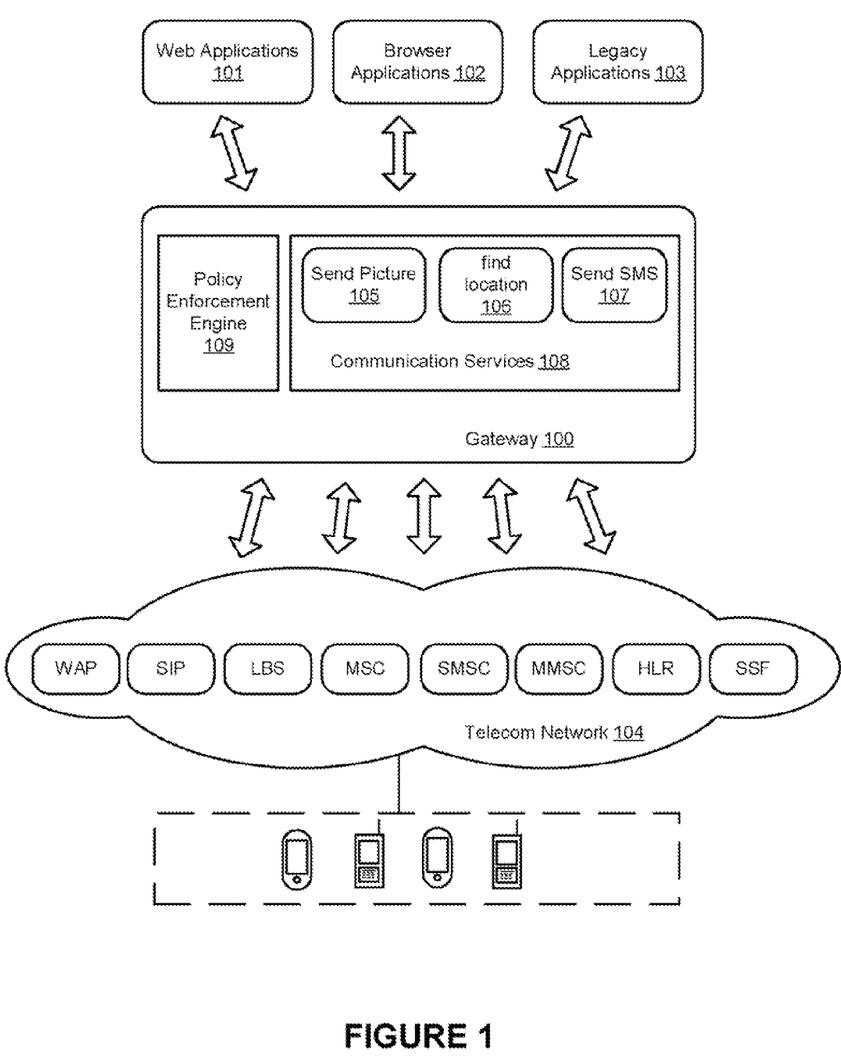
FIG. 1 is an illustration of a gateway containing communication services in accordance with various embodiments of the invention.

FIG. 1 is an illustration of a gateway containing communication services in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the gateway 100 can be positioned between the telecom network 104 and a multitude of different service provider applications 101, 102, 103 residing externally with respect to the telecom network. The gateway can play an intermediary role between the request traffic sent from the applications to the resource in the telecom network and requests sent from the network to the applications. In accordance with various embodiments, the gateway can include a number of communication services that enable the clients (101, 102, 103) of the gateway to access the functionality in the telecom network. These communication services 108 can comprise a set of Java classes and methods that can be used by the client applications to perform various functions, such as send a short messaging service (SMS) message 107, send a multimedia messaging service (MMS) containing a picture 105, find terminal location 106 and the like. A policy enforcement engine 109 can enforce a set of rules and policies according to service level agreements (SLAB) established between the network operator and its clients. These policies can control which clients can access which services, how many messages or transactions per second the client is allowed to perform and other restrictions.

Figure 2:
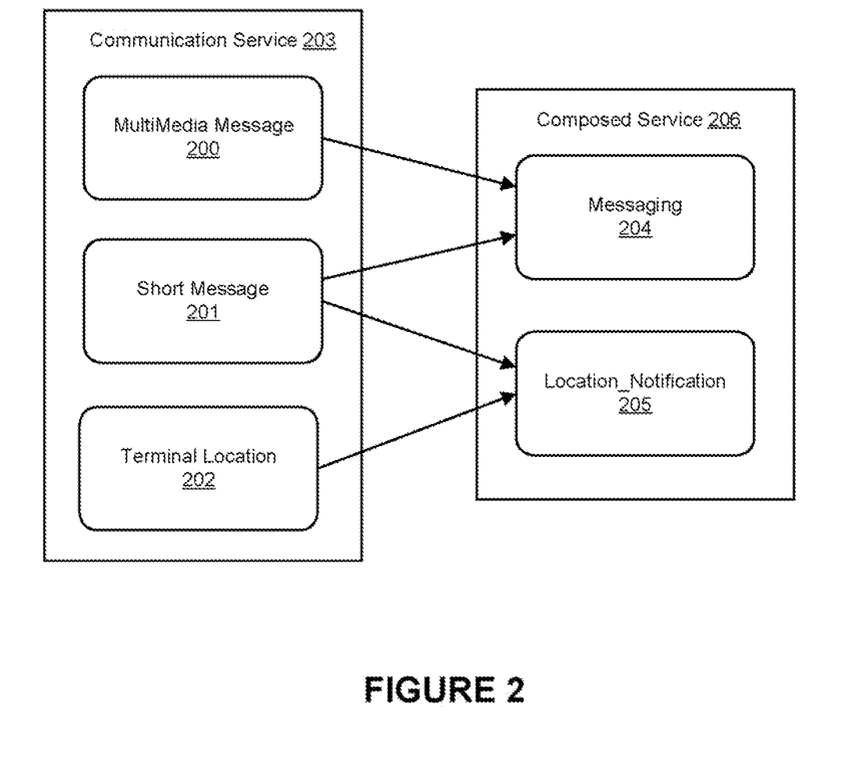
FIG. 2 is an illustration of several composed services, in accordance with various embodiments of the invention.

FIG. 2 is an illustration of several composed services, in accordance with various embodiments of the invention. As illustrated therein, the gateway can contain a number of communication services 203 including but not limited to Multimedia Message 200, Short Message 201 and Terminal Location 202. In accordance with an embodiment, the gateway can also enable a user or operator to define one or more composed services 206. For example, an operator can define a messaging composed service 204 which includes all methods from Short message communication service 201 and the Multimedia Message communication service 200. As another example, a Location Notification composed service 205 can be created, which includes methods from the Short Message communication service 201 and the Terminal Location service 202.

Figure 3:
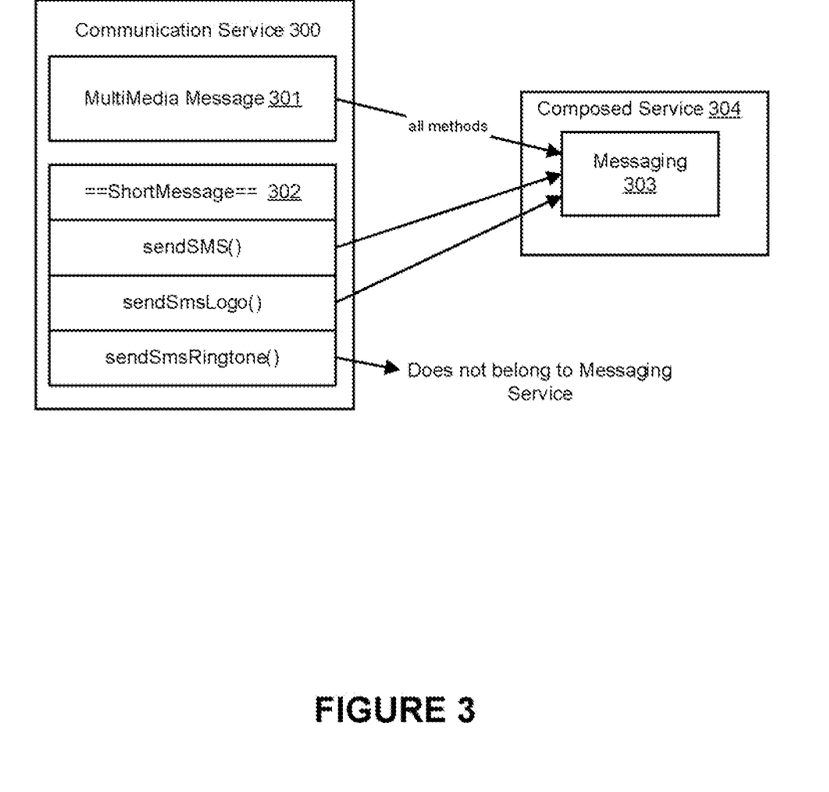
FIG. 3 is an illustration of creating a composed service on a method granularity level, in accordance with various embodiments of the invention.

FIG. 3 is an illustration of creating a composed service on a method granularity level, in accordance with various embodiments of the invention. As illustrated, a messaging 303 composed service 304 is created. This virtual service includes all the methods from the Multimedia Message communication service 301. The messaging composed service 303 also contains some methods from the SMS Messaging communication service, however not all of them. As shown in the illustration, the messaging composed service 303 includes the sendSMS( ) and the sendSmsLogo( ) methods, however it does not include the sendSmsRingtone( ) method. In this manner, the composed services can be created on a per class or per method basis.

Figure 4:
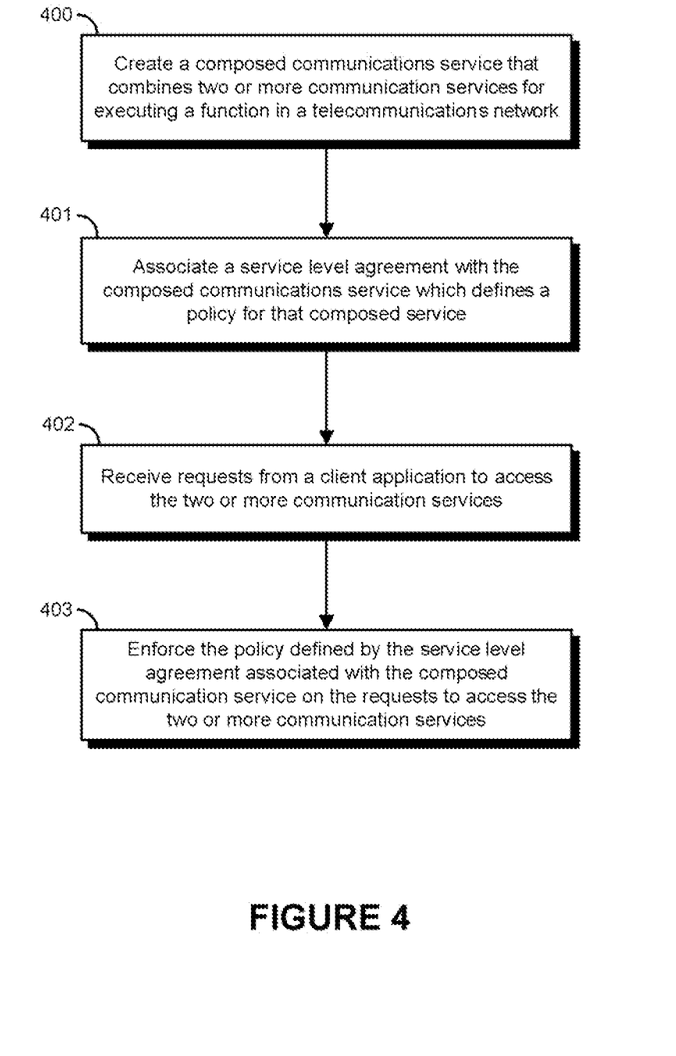
FIG. 4 is an illustration of the process for creating and employing composed services in a gateway, in accordance with various embodiments of the invention.

FIG. 4 is an illustration of the process for creating and employing composed services in a gateway, in accordance with various embodiments of the invention. As illustrated in step 400, a composed communications service is created, which combines two or more communication services for executing a function in a telecommunications network. In step 401, a service level agreement (SLA) is associated with the composed communications service. The service level agreement defines a policy for the composed communications service. In step 402, the gateway receives requests from a client application to access the two or more communication services. In step 403, the gateway can enforce the policy defined by the service level agreement associated with the composed communication service on the requests to access the two or more communication services.

Figure 5:
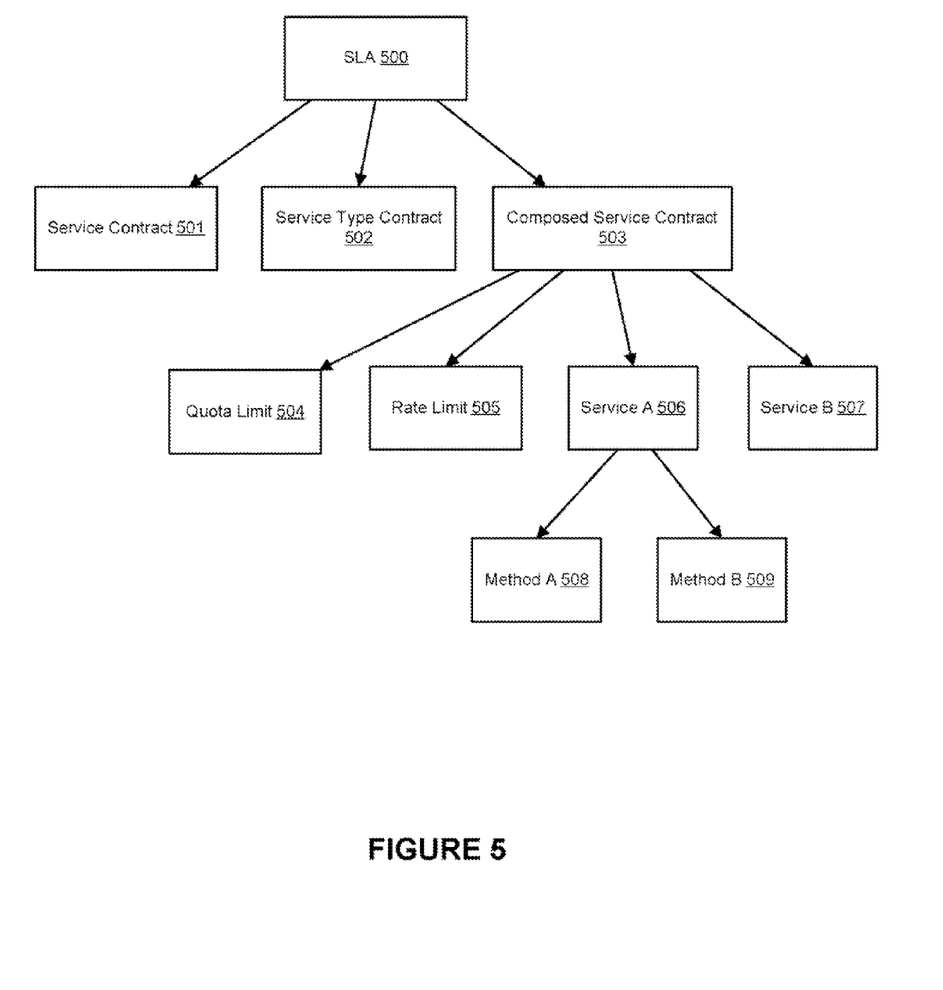
FIG. 5 is an illustration of the structure of the composed service contract, in accordance with various embodiments of the invention.

FIG. 5 is an illustration of the structure of the composed service contract, in accordance with various embodiments of the invention. As illustrated, the XSD schema of the SLA 500 can be extended with the ability to define a composed service contract 503 in addition to the service contract 501 and service type contract 502 elements. Multiple communication services can be grouped together and a rate quota restriction can be assigned to them in the SLA. For example, the composed service contract allows the operator to define the quota limit 504 and the rate limit 505 for the services 506, 507 and the methods in those services 508, 509. It should be noted that the schema illustrated in FIG. 5 is provided purely for purposes of illustration and is not intended to be limiting to all embodiments of the invention. It will be apparent to one of ordinary skill in the art that a number of other XSD schemas can be used for the purposes of creating composed services described herein, within the scope of the present disclosure.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for creating composed communication services in a telecommunications environment, comprising:
   creating a composed communication service that combines a plurality of communication services, wherein each of the plurality of communication services includes a plurality of methods, for executing a function in a telecommunications network;
   associating a service level agreement with said composed communication service, said service level agreement defining a policy for the composed communication service;
   receiving a communication request, originated by a service subscriber, to access at least one of the plurality of communication services;
   modifying the composed communication service to include the methods contained in the plurality of communication services;
   invoking the communication request on the composed communication service as modified; and
   enforcing the policy defined by the service level agreement associated with said composed communication service on the communication request to access the plurality of communication services.

2. The method of claim 1, wherein the composed communication service is created within a gateway to the telecommunications network.

3. The method of claim 1, wherein the composed communication service includes a subset of all methods in the plurality of communication services.

4. The method of claim 1, wherein the SLA is defined on either application group scope or service provider group scope.

5. The method of claim 1, wherein the SLA includes all service types of selected communication service and request rate/quota restriction information.

6. The method of claim 1, wherein all of said plurality of communication services in the composed communication service share a same budget restriction in said SLA.

7. The method of claim 1, wherein a single communication service is included in multiple composed communication services.

8. The method of claim 1, wherein enforcing the policy further includes triggering an increase of a budget upon receiving the communication request, and if the request exceeds a restriction, denying a plurality of subsequent communication requests of the composed service.

9. The method of claim 1, wherein all communication services are registered in a gateway to the telecommunications network.

10. A system for creating composed communication services in a telecommunications environment, said system comprising a computer readable storage medium and one or more hardware processors that execute a set of instructions to perform the steps comprising:
    creating a composed communication service that combines a plurality of communication services, wherein each of the plurality of communication services includes a plurality of methods, for executing a function in a telecommunications network;
    associating a service level agreement with said composed communication service, said service level agreement defining a policy for the composed communication service;
    receiving a communication request, originated by a service subscriber, to access at least one of the plurality of communication services;
    modifying the composed communication service to include the methods contained in the plurality of communication services;
    invoking the communication request on the composed communication service as modified; and
    enforcing the policy defined by the service level agreement associated with said composed communication service on the communication request to access the plurality of communication services.

11. The system of claim 10, wherein the composed communication service is created within a gateway to the telecommunications network.

12. The system of claim 10, wherein the composed communication service includes a subset of all methods in the plurality of communication services.

13. The system of claim 10, wherein the SLA is defined on either application group scope or service provider group scope.

14. The system of claim 10, wherein the SLA includes all service types of selected communication service and request rate/quota restriction information.

15. The system of claim 10, wherein all of said plurality of communication services in the composed communication service share a same budget restriction in said SLA.

16. The system of claim 10, wherein a single communication service is included in multiple composed communication services.

17. The system of claim 10, wherein enforcing the policy further includes triggering an increase of a budget upon receiving the communication request, and if the request exceeds a restriction, denying a plurality of subsequent requests of the composed service.

18. The system of claim 10, wherein all communication services are registered in a gateway to the telecommunications network.

19. A non-transitory computer readable storage medium storing one or more sequences of instructions executable by one or more processors to perform the steps comprising:

creating a composed communication service that combines a plurality of communication services, wherein each of the plurality of communication services includes a plurality of methods, for executing a function in a telecommunications network;

associating a service level agreement with said composed communication service, said service level agreement defining a policy for the composed communication service;

receiving a communication request, originated by a service subscriber, to access at least one of the plurality of communication services;

modifying the composed communication service to include the methods contained in the plurality of communication services;

invoking the communication request on the composed communication service as modified; and enforcing the policy defined by the service level agreement associated with said composed communication service on the communication request to access the plurality of communication services.

\* \* \* \* \*

UNITED STATES PATENT AND TRADEMARK OFFICE
CERTIFICATE OF CORRECTION

PATENT NO. : 8,787,386 B2
APPLICATION NO. : 13/277968
DATED : July 22, 2014
INVENTOR(S) : Nimashakavi et al.

Page 1 of 1

It is certified that error appears in the above-identified patent and that said Letters Patent is hereby corrected as shown below:

In the Specification

In column 3, line 51, delete "(SLAB)" and insert -- (SLAs) --, therefor.

Signed and Sealed this
Seventeenth Day of March, 2015

Michelle K. Lee
*Director of the United States Patent and Trademark Office*